Aug. 25, 1953 P. J. SIRKO 2,649,785
SINE BAR FIXTURE
Filed Feb. 10, 1949 2 Sheets-Sheet 1
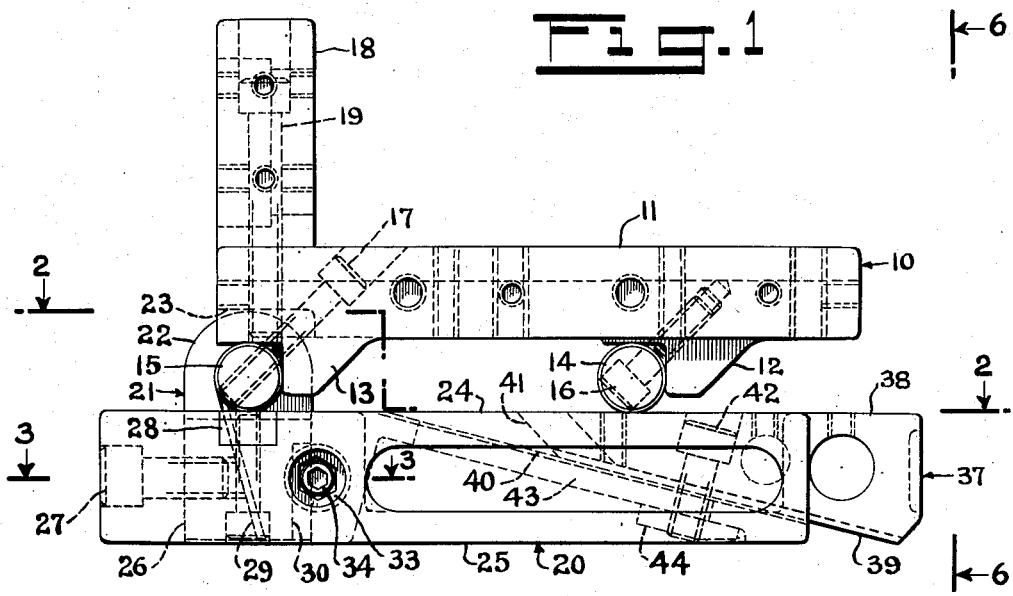
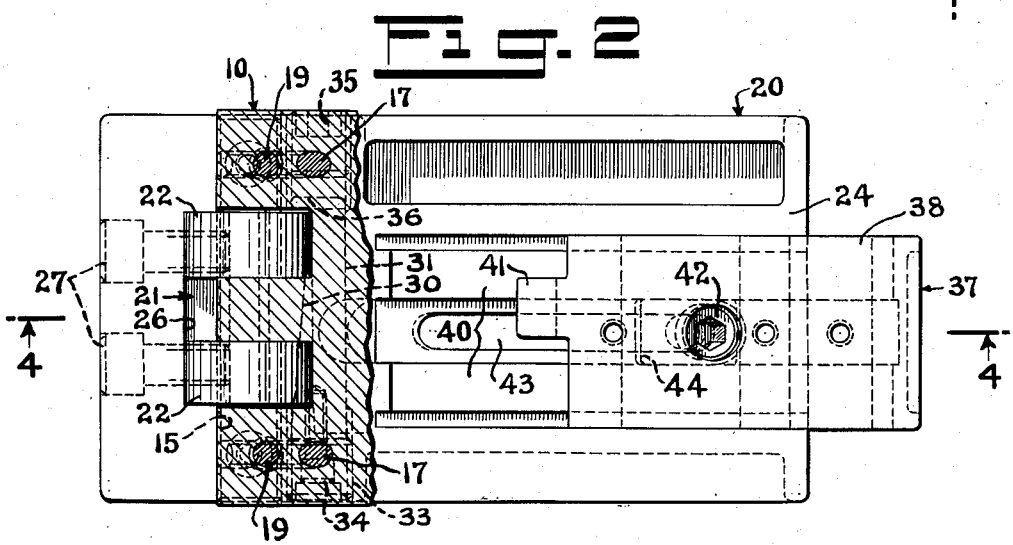
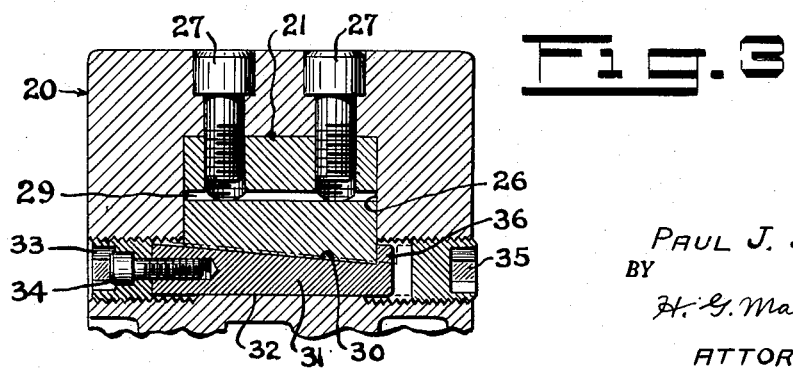
INVENTOR.
PAUL J. SIRKO
BY
H. G. Manning
ATTORNEY Aug. 25, 1953 P. J. SIRKO 2,649,785
SINE BAR FIXTURE
Filed Feb. 10, 1949 2 Sheets-Sheet 2
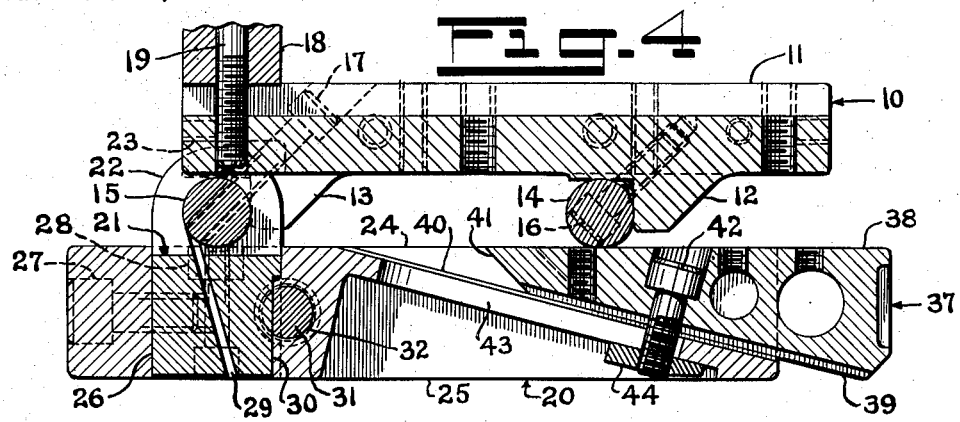
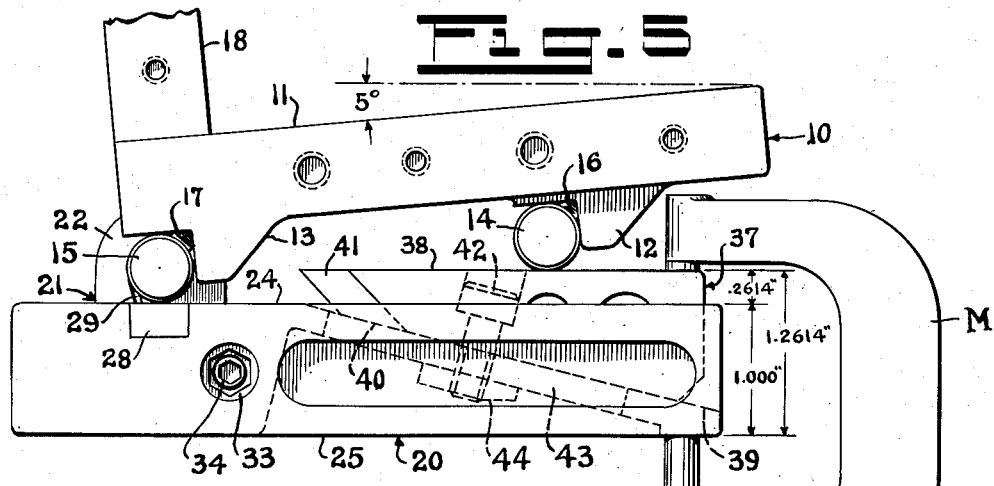
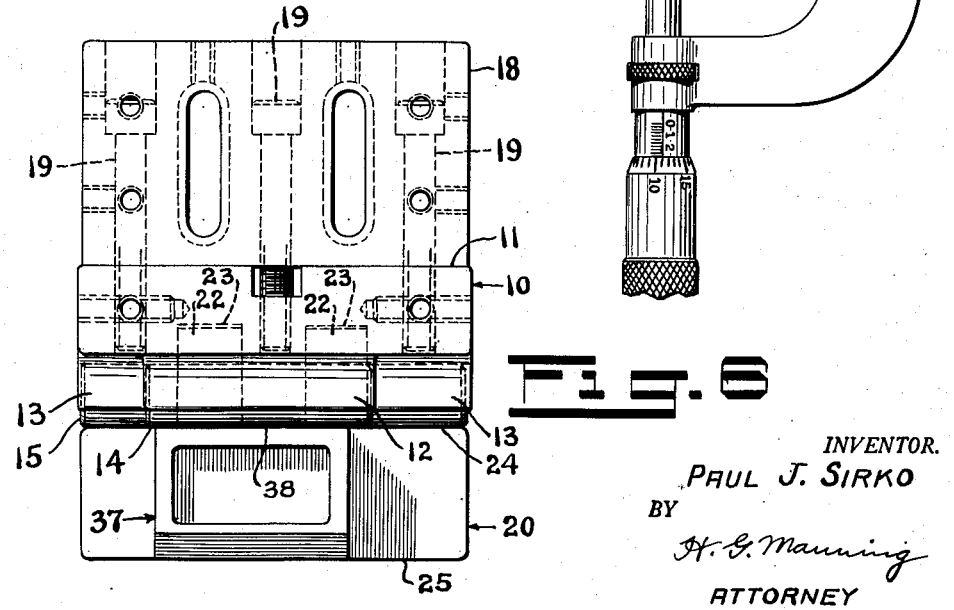
INVENTOR.
PAUL J. SIRKO
BY
H. G. Manning
ATTORNEY Patented Aug. 25, 1953

2,649,785

UNITED STATES PATENT OFFICE 2,649,785

SINE BAR FIXTURE

Paul J. Sirko, New Britain, Conn.

Application February 10, 1949, Serial No. 75,730

3 Claims. (Cl. 33—174)

This invention relates to devices for accurately determining or checking the angular relation of work-piece surfaces, and more particularly to a sine bar fixture by which any angle may be determined without the use of gauge blocks of odd sizes.

It has been customary in the use of sine bars to produce the desired angle between the sine bar and a surface plate by raising one end of the sine bar upon the required number of gauge blocks, thus permitting the angle to be determined by means of its sine, which was indicated by the ratio of the total thickness of the gauge blocks to the effective length of the sine bar between its points of support.

In order to make this procedure effective for angles of any size, it was necessary that the operator have available a sufficiently large and varied number of gauge blocks to enable him to obtain any composite thickness of blocks within the limits of the sine bar. In practice, the necessary blocks were an item of considerable expense, in view of their high initial cost and the necessity for frequent replacement due to wear.

Further, the selection and assembly of the blocks necessary to provide any specific thickness was a time-consuming operation, since the thickness must usually be accurate to 0.0001".

Accordingly, one object of this invention is to provide a sine bar having means for precisely adjusting the bar within a certain range of angles, without the use of gauge blocks.

Another object is to provide a device of the above nature in which the range of adjustment may be increased by the use of a single gauge block of unit thickness, thus entirely avoiding the use of odd-size gauge blocks.

Another object is to provide a device of the above nature in which the adjustment is obtained by means of a tapered slide.

Another object is to provide a device of the above nature which includes improved means for securing the sine bar in any adjusted position.

A further object is to provide a device of the above nature which will be simple in construction, inexpensive to manufacture, easy to use and manipulate, compact, and very efficient and durable in use.

With these and other objects in view, there has been illustrated on the accompanying drawings one form in which the invention may conveniently be embodied in practice.

In the drawings,

Fig. 1 is a side view of the improved sine bar fixture, as it would appear when the sine bar is in a horizontal or zero angle position.

Fig. 2 is a plan view of a portion of the same, partly in section, as it would appear looking from the broken line 2—2 of Fig. 1.

Fig. 3 is a fragmentary cross-sectional view, taken along the line 3—3 of Fig. 1, showing the sine bar locking means.

Fig. 4 is a longitudinal sectional view, taken substantially on the line 4—4 of Fig. 2.

Fig. 5 is a side view, similar to Fig. 1, but showing how the fixture would be adjusted to provide an angle of 5 degrees, by way of example.

Fig. 6 is a front view, taken from the line 6—6 of Fig. 1.

Referring now to the drawings, in which like reference numerals denote corresponding parts throughout the several views, the numeral 10 indicates a rectangular sine bar which has a flat upper surface 11 and which is provided upon its lower surface with a transverse front angular abutment 12 and a pair of aligned transverse rear angular abutments 13, 13.

Provision is made of a pair of transverse horizontal cylindrical supporting shafts 14, 15, which are secured against the angular abutments 12, 13, respectively by means of inclined headed countersunk screws 16, 17. The supporting shafts 14, 15 have identical diameters, and are precisely parallel to each other—the abutments 12, 13 being so formed as to maintain the central axes of said shafts accurately at equal distances below the upper surface 11 of the sine bar 10.

It will be thus seen that the inclination of the upper surface 11 of the sine bar 10 will always be accurately represented by the location of the lowermost surfaces of the shafts 14, 15.

Further, the angular abutments 12, 13 are preferably so formed as to hold the central axes of the shafts 14, 15 spaced from each other at a distance represented by whole distance units in order to simplify computation of the sine of the angle of the sine bar 10 as will be hereinafter described.

The utility of the sine bar 10 is increased by the provision of an upstanding angle plate 18 which is secured at 90 degrees to the upper sine bar surface 11 by means of countersunk screws 19, 19. It will be seen that the angle plate 18 not only serves as an abutment for work upon the sine bar surface 11, but also enables angles to be computed in some cases by means of their supplemental angles.

The sine bar 10 is pivoted upon a rectangular base 20 by means of a rectangular locking fixture 21 having a pair of spaced, upstanding, apertured lugs 22, 22 which embrace the rear supporting shaft 15 inwardly of the rear angular abutments 13, 13, a pair of recesses 23, 23 being provided in the undersurface of the sine bar 10 in order to provide ample clearance for said lugs 22, 22.

The base 20 has accurately finished upper and lower parallel surfaces 24, 25 and is provided with a vertical rectangular aperture 26 in its rear portion, in which the locking fixture 21 is secured by screws 27, 27, said fixture being fastened in such a position that the ends of the rear supporting shaft 15 will be held in tangent relation to the upper base surface 24. In order to minimize the effects of wear upon the base 20 by the shaft 15, a pair of hard steel wear plates 28, 28 are so mounted in the base 20 as to be flush with the upper base surface 24 under the ends of said shaft 15.

The apertured lugs 22, 22 are rendered sufficiently flexible to grip the supporting shaft 15 by means of an inclined slit 29 which extends downwardly from the apertures of the lugs 22 and transversely divides the lower portion of the locking fixture 21—thus permitting the sine bar 10 to be locked in any desired adjusted condition.

The front side of said locking fixture 21 is provided with a beveled vertical surface 30, which is adapted to be engaged by a horizontal locking wedge 31 slidably disposed in a transverse cylindrical bore 32 intersecting the front portion of the vertical base aperture 26.

In order to operate the locking wedge 31, provision is made of a horizontal locking screw 33 which is engaged in a tapped end portion of the transverse bore 32 and is secured to one end of said locking wedge 31 by means of a headed pivot screw 34.

By means of this construction, it will be seen that rotation of the locking screw 33 will slide the wedge 31 along the bevelled surface 30 so as to flex the apertured lugs 22, 22 thereby firmly clamping or releasing the supporting shaft 15 as the case may be.

The opposite end of the transverse bore 32 is preferably closed by means of a horizontal screw 35, which will not only prevent the entrance of dirt, but may also be turned inwardly to release the locking wedge 31 in the event that said wedge should become jammed against the locking fixture 21. The inner end of the locking wedge 31 preferably has a shouldered nose 36 (Fig. 3) which is adapted to engage the side of the locking fixture 31 so as to limit outward movement of said wedge.

In order to preset the sine bar 10 in a specific angular relation to the base 20, or to "gauge" such an angle, provision is made of a tapered slide 37 which is in effect an adjustable gauge block having a flat upper horizontal surface 38 and a flat inclined lower surface 39. The slide 37 is longitudinally adjustable upon a pair of inclined ways 40, 40, which are recessed below the upper surface 24 of the base 20, and which are inclined at such an angle as to maintain the upper surface 38 of the slide 37 always precisely parallel to said upper base surface 24.

As will be seen in the drawings, the upper surface 38 of the slide 37 is of sufficient longitudinal extent to permit its engagement by the front sine bar supporting shaft 14 at any stage of the adjustment of said slide 37 and said upper surface 38 is provided with a narrow inner extension 41 which is adapted to enter between the lugs 22, 22 at the highest adjusted position of the slide 37.

Moreover, the greatest thickness of the slide 37 is equal to, or less than, the thickness of the base 20, so that when the upper slide surface 38 is disposed in the same plane as the upper surface 24 of the base 20 (Fig. 1), said slide 37 will not project below the plane of the lower base 25 and thus will not interfere with the seating of the base 20 upon a supporting surface.

As a provision for holding the slide 37 in any desired stage of adjustment, a central inclined headed clamping screw 42 extends downwardly through said slide and through a longitudinal slot 43 in the base 20 between the ways 40. The ends of the slot 43 will, of course, serve as stops to limit the movements of the screw 42 and the slide 37 when the clamping screw 42 is released.

In order to facilitate measurement of the height of the front sine bar supporting shaft 14 above the upper base surface 24, as will be described hereinafter, the base 20 preferably is of a standard unit thickness, such as one inch.

*Operation*

In operation, the first step in setting the sine bar 10 at the desired angle will be to determine the sine of the angle from any suitable table of trigonometric functions. Assuming for purposes of description that the desired angle is 5 degrees, as shown by way of example in Fig. 5, the sine will be 0.08715. The center-to-center spacing of the sine bar supporting shafts 14, 15 will be equal to a number of whole measurement units, as hereinbefore described, and if this spacing is presumed in this example, to be three inches, the sine will be multiplied by three, thus giving a product of 0.2614. If the thickness of the base 20 is 1" the product 0.2614 will be added thereto, thus establishing the sum of 1.2614" as the setting for a micrometer M which will be used to determine the proper adjustment of the tapered slide 37.

The slide 37 will, of course, be slid inwardly and upwardly until the distance between the lower base surface 25 and the upper slide surface 38 is exactly 1.2614 inches as determined by the micrometer M (Fig. 5).

The slide clamping screw 42 will then be tightened, and it will be clear from the above that, when the front sine bar supporting shaft 14 is engaged with the tapered slide 37, the angle which the upper sine bar surface 11 makes with the lower base surface 25 will be exactly 5 degrees.

The sine bar 10 may then be locked in position by turning the screw 33 inwardly, whereby the locking wedge 31 will compress the locking fixture 21 so as to firmly grip the rear sine bar supporting shaft 15. It will be noted that the operation of compressing the locking fixture 21 by the sliding of the wedge 31 will tend to urge the supporting shaft 15 in a clockwise direction, as viewed in Fig. 1, so that the front sine bar supporting shaft 14 will be held firmly and positively against the upper slide surface 38.

The sine bar fixture may then be disposed upon any suitable flat surface plate, so as to permit work upon the sine bar 10 to be checked by means of a height gauge in the usual manner.

If it is desired to set the sine bar 10 at an angle greater than that which can be provided by the tapered slide 37, this may be readily done by means of a single gauge block of unit thickness, such as ½ inch or one inch (not shown), which will be disposed between the upper slide surface 38 and the front sine bar supporting shaft 14. When such an auxiliary gauge block is used in this manner, the thickness of said block, will, of course, be subtracted from the computed figure obtained by the method described above in order to obtain the setting of the micrometer M which will be employed to measure the combined thickness of the base 20 and the slide 13.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a sine bar fixture, an upper sine bar having a pair of front and rear parallel cylindrical transverse shafts adjustably secured to the undersurface thereof, an underlying base, a longitudinally movable tapered slide mounted on said base, means to connect said slide to said base in any desired adjusted position, a locking fixture mounted on said base and having a resilient split section embracing said rear shaft, and a screw-operated wedge compressing said split section to clamp it securely upon said rear shaft for holding said sine bar against swinging movement.

2. The invention as defined in claim 1, in which said front and rear shafts are of equal diameter and are secured to said sine bar at the same distance below the upper surface thereof, whereby the relation of said front shaft to the upper surface of said base may be employed in accurately determining the angle of the upper surface of the sine bar with relation to said base.

3. The invention as defined in claim 1, in which the upper surface of said tapered slide is disposed at a unit distance above the lower surface of said base when said slide is adjusted to provide a zero angle of said sine bar with relation to said base, thereby facilitating the use of a micrometer to determine the setting of said slide.

PAUL J. SIRKO.

References Cited in the file of this patent

UNITED STATES PATENTS

| Number | Name | Date |
| --- | --- | --- |
| 1,001,631 | Gardner | Aug. 29, 1911 |
| 1,463,406 | Serrell | July 31, 1923 |
| 1,489,576 | Hanson | Apr. 8, 1924 |
| 2,113,287 | Baldenhofer | Apr. 5, 1938 |
| 2,219,180 | Fitcher | Oct. 22, 1940 |
| 2,364,546 | Niemi | Dec. 5, 1944 |
| 2,398,121 | Silvermaster | Apr. 9, 1946 |

OTHER REFERENCES

Herlth Adjustable Parallel Gauges Catalogue, O. B. Herlth Mfg. Co., Inc., 272 Tolland St., E. Hartford, Conn. (Office date June 21, 1924.)

American Machinist, June 6, 1946, page 143.